(12) United States Patent
Anya et al.

(10) Patent No.: US 11,057,284 B2
(45) Date of Patent: Jul. 6, 2021

(54) COGNITIVE QUALITY OF SERVICE MONITORING

(71) Applicant: International Business Machines Corporation, Armonk, NY (US)

(72) Inventors: Obinna B. Anya, San Jose, CA (US); Heiko H. Ludwig, San Francisco, CA (US); Nagapramod S. Mandagere, San Jose, CA (US); Mohamed Mohamed, San Jose, CA (US); Mu Qiao, Belmont, CA (US); Ramani R. Routray, San Jose, CA (US); Samir Tata, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 15/615,151

(22) Filed: Jun. 6, 2017

(65) Prior Publication Data
US 2018/0352025 A1    Dec. 6, 2018

(51) Int. Cl.
H04L 12/26    (2006.01)
H04L 12/24    (2006.01)

(52) U.S. Cl.
CPC .......... H04L 43/08 (2013.01); H04L 41/0816 (2013.01); H04L 41/147 (2013.01); H04L 41/5009 (2013.01)

(58) Field of Classification Search
CPC .................................................. H04L 43/0876
USPC ........................................................ 709/224
See application file for complete search history.

(56) References Cited

U.S. PATENT DOCUMENTS

| 5,729,472 | A | 3/1998 | Seiffert et al. |
| 5,787,409 | A | 7/1998 | Seiffert et al. |
| 7,203,868 | B1 | 4/2007 | Evoy |
| 8,166,152 | B1 | 4/2012 | Delcheva et al. |
| 9,495,395 | B2 | 11/2016 | Chan et al. |
| 2005/0172027 | A1* | 8/2005 | Castellanos ......... H04L 41/5009 709/229 |
| 2014/0055458 | A1 | 2/2014 | Bogdany et al. |
| 2016/0028599 | A1* | 1/2016 | Vasseur ................ H04L 41/145 370/252 |

(Continued)

FOREIGN PATENT DOCUMENTS

WO    2009053955 A2    4/2009

OTHER PUBLICATIONS

Alhazamani, K. et al., "An overview of the commercial cloud monitoring tools: Research dimensions, design issues, and state-of-the-art." Apr. 2015, p. 357-377, Computing, vol. 97. No. 4, United States.

(Continued)

Primary Examiner — Moustafa M Meky
Assistant Examiner — Sm Z Islam
(74) Attorney, Agent, or Firm — Sherman IP LLP; Kenneth L. Sherman; Hemavathy Perumal

(57) ABSTRACT

One embodiment provides a quality of service (QoS) monitoring framework for dynamically binding one or more customer applications to one or more microservices in a dynamic service environment, collecting compliance data and contextual data from the dynamic service environment and one or more hosting environments, and modifying a monitoring infrastructure for the one or more customer applications based on the compliance data and the contextual data.

20 Claims, 9 Drawing Sheets

(56) References Cited

U.S. PATENT DOCUMENTS

| | | | | |
|---|---|---|---|---|
| 2016/0330746 | A1* | 11/2016 | Mehrabanzad | H04W 76/10 |
| 2016/0337883 | A1* | 11/2016 | Raleigh | H04L 47/19 |
| 2018/0203978 | A1* | 7/2018 | Basu | G16H 50/70 |
| 2018/0241644 | A1* | 8/2018 | Lu | H04L 43/0882 |

OTHER PUBLICATIONS

Alhamazani, K. et al., "Cloud monitoring for optimizing the QoS of hosted applications," IEEE 4th International Conference on Cloud Computing Technology and Science (CloudCom), pp. 765-770, 2012, IEEE, United States.

Yunshui, L. et al., "Real-Time Dynamic Cloud Monitoring System Based on SLA," International Journal of Automation and Power Engineering 2.4, pp. 142-146, May 2013 [Abstract Only].

Oriol, M. et al., "Monitoring the service-based system lifecycle with SALMon." Expert Systems with Applications, pp. 6507-6521, 2015, 42.19, Barcelona.

Mdhaffar, A. "Cross-Layer Cloud Performance Monitoring, Analysis and Recovery." Dissertation, pp. 176, Dec. 2014, Vom Fachbereich Mathematik and Informatik at Philipps-University, Marburg, Germany.

Cherif et al., "Adaptable web service registry for publishing context aware service composition," Proceedings of the 17th International Conference on Information Integration and Web-based Applications & Services, pp. 1-8, Dec. 2015, ACM, United States.

Grati, R. et al., A QoS monitoring framework for composite web services in the cloud. In The Sixth International Conference on Advanced Engineering Computing and Applications in Sciences, pp. 65-70, Sep. 2012, ADVCOMP, United States.

Shao, J. et al. "A runtime model based monitoring approach for cloud." 2010 IEEE 3rd International Conference on Cloud Computing, pp. 313-320, 2010, IEEE, United States.

Mell, P., et al., "The NIST Definition of Cloud Computing", National Institute of Standards and Technology Special Publication 800-145, Sep. 2011, pp. 1-7, U.S. Department of Commerce, United States.

\* cited by examiner

COGNITIVE QUALITY OF SERVICE MONITORING

The present invention generally relates to quality of service (QoS) monitoring, and more particularly, to a cognitive QoS monitoring framework for predictive QoS monitoring in a dynamic service environment.

BACKGROUND

In dynamic cloud service environments, cloud service monitoring is necessary to avoid service level agreement (SLA) violations and ensure service quality. Cloud service providers want to avoid paying high penalties resulting from SLA violations. Customers want to ensure the service they are paying for meets the SLA.

SUMMARY

One embodiment provides a quality of service (QoS) monitoring framework for dynamically binding one or more customer applications to one or more microservices in a dynamic service environment, collecting compliance data and contextual data from the dynamic service environment and one or more hosting environments, and modifying a monitoring infrastructure for the one or more customer applications based on the compliance data and the contextual data.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
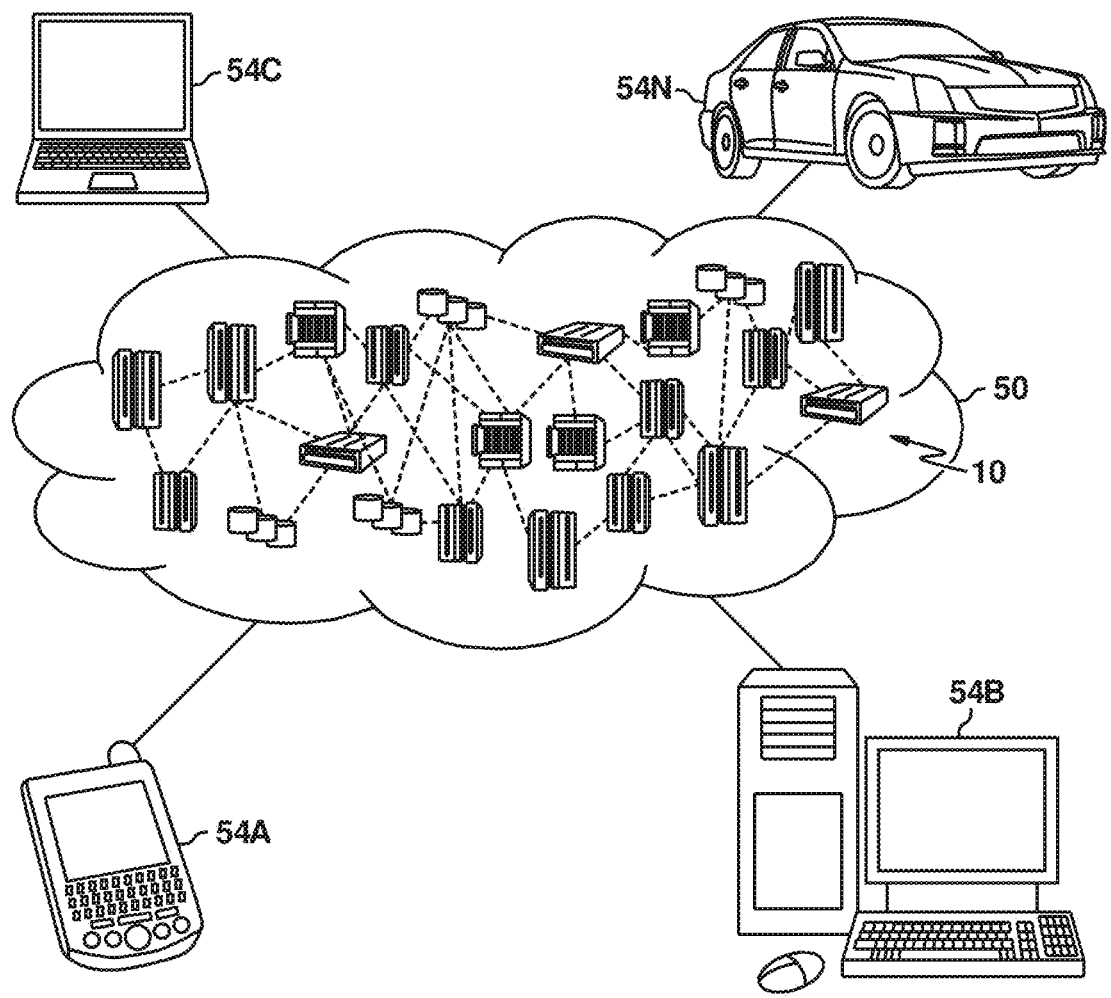
FIG. 1 depicts a cloud computing environment according to an embodiment of the present invention.

The detailed description explains the preferred embodiments of the invention, together with advantages and features, by way of example with reference to the drawings.

DETAILED DESCRIPTION

The present invention generally relates to quality of service (QoS) monitoring, and more particularly, to a cognitive QoS monitoring framework for predictive QoS monitoring in a dynamic service environment. One embodiment provides a QoS monitoring framework for dynamically binding one or more customer applications to one or more microservices in a dynamic service environment, collecting compliance data and contextual data from the dynamic service environment and one or more hosting environments, and modifying a monitoring infrastructure for the one or more customer applications based on the compliance data and the contextual data.

For expository purposes, the term "service level agreement" as used in this specification generally refers to an agreement/contract between a service provider and a customer (e.g., an end user) specifying/defining a level of service expected from the service provider. The term "service level objective" as used in this specification generally refers to a key element of a service level agreement (SLA) between a service provider and a customer, the SLO defining a commitment of the service provider to the customer as a set of measurable metrics. The term "SLA violation" as used in this specification generally refers to a violation of a SLA between a service provider and a customer, the SLA violating occurring if the service provider fails to meet a SLO of the SLA.

Conventional approaches to cloud service monitoring are not cost-effective in terms of operational/monitoring costs, storage, or analysis of monitoring data. For example, costs associated with continuous monitoring on a cloud service environment may be prohibitively high. These existing approaches rely on predefined status-checkpoints using schedulers and event-based rules, and operate reactively by adjusting monitoring capabilities dynamically after a SLA violation has occurred. Such approaches lack support for predictively identifying customers' monitoring needs and dynamically optimizing available resources to meet these needs.

In dynamic service environments such as cloud service environments, effective application management requires a proactive means for dynamically modifying and adapting monitoring infrastructures for the dynamic service environments to meet customer requirements (i.e., customers' monitoring needs) and SLA specifications.

One or more embodiments of the invention provide a cognitive QoS monitoring framework for predictive QoS monitoring in a dynamic service environment (e.g., a dynamic cloud service environment). The monitoring framework predictively learns compliance data about a monitored system (e.g., one or more customer applications bound to one or more microservices in the dynamic service environment), current performance of the monitored system, and one or more underlying hosting environments associated with the monitored system. The monitoring framework dynamically modifies and adapts a monitoring infrastructure for the dynamic service environment in order to reduce operational/monitoring costs and pre-emptively optimize the monitoring infrastructure to suit customers' monitoring needs and/or SLA specifications. The monitoring framework uses machine learning for predictive determination of time periods (i.e., monitoring windows) for dynamic monitoring of the monitored system. The monitoring framework maximizes probability of identifying SLA violations while reducing operational/monitoring costs. The monitoring framework learns to detect symptoms of failure (i.e., SLA violations) based on historical data indicative of compliance with SLAs, and predicts best fit time periods for adjusting a frequency at which the monitoring infrastructure monitors the monitored system. The monitoring framework proactively adjusts the frequency based on detected symptoms of failure rather than occurrences of failure. The monitoring framework allows for cognitive reconfiguration of monitoring interfaces to heterogeneous services across dynamic service environments.

In one embodiment, the monitoring framework may be implemented as a machine learning based dynamic cloud service monitoring framework that automatically determines a monitoring window for a dynamic cloud service environment. Specifically, the monitoring framework is configured to automatically trigger/invoke cloud service monitoring of the cloud service environment when probability of SLA violations occurring exceeds a pre-determined threshold, and automatically stop/pause the cloud service monitoring when the probability is less than the threshold.

One or more embodiments of the invention provide a system and method for specifying one or more reconfigurable monitoring objects for supporting dynamic and adaptive modification of a monitoring infrastructure for a dynamic service environment (e.g., a dynamic cloud service environment).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
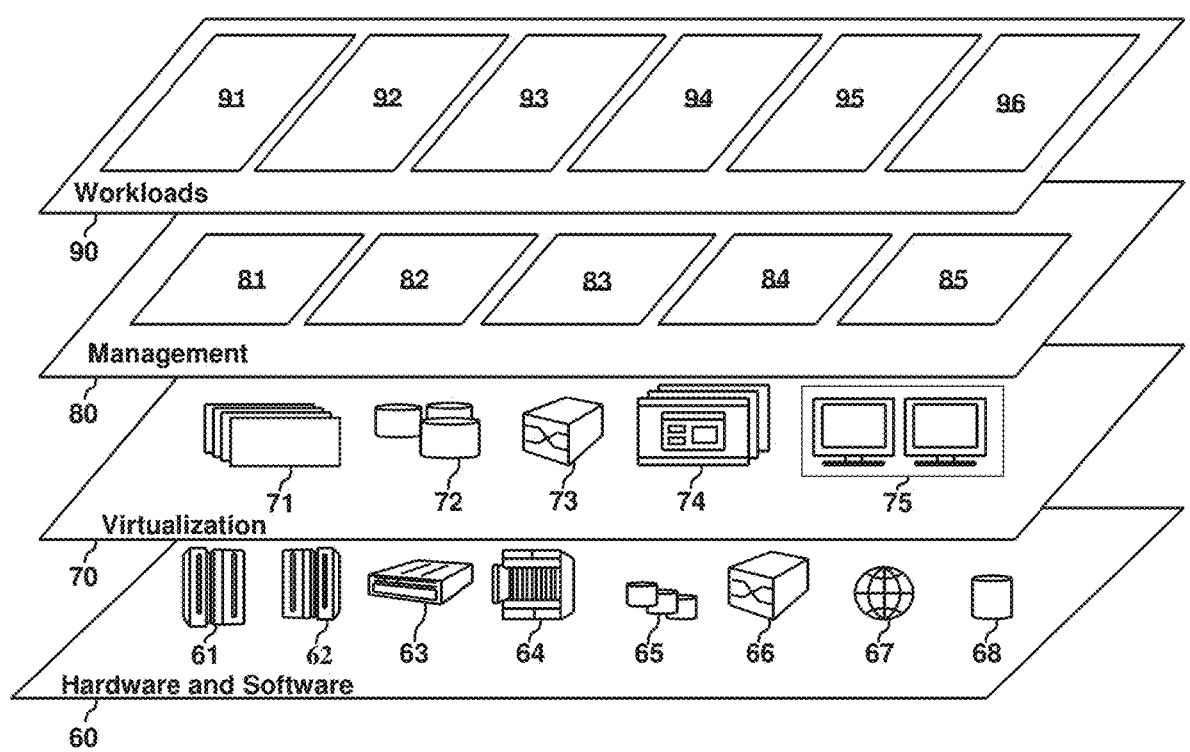
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. SLA planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive QoS monitoring 96.

Figure 3:
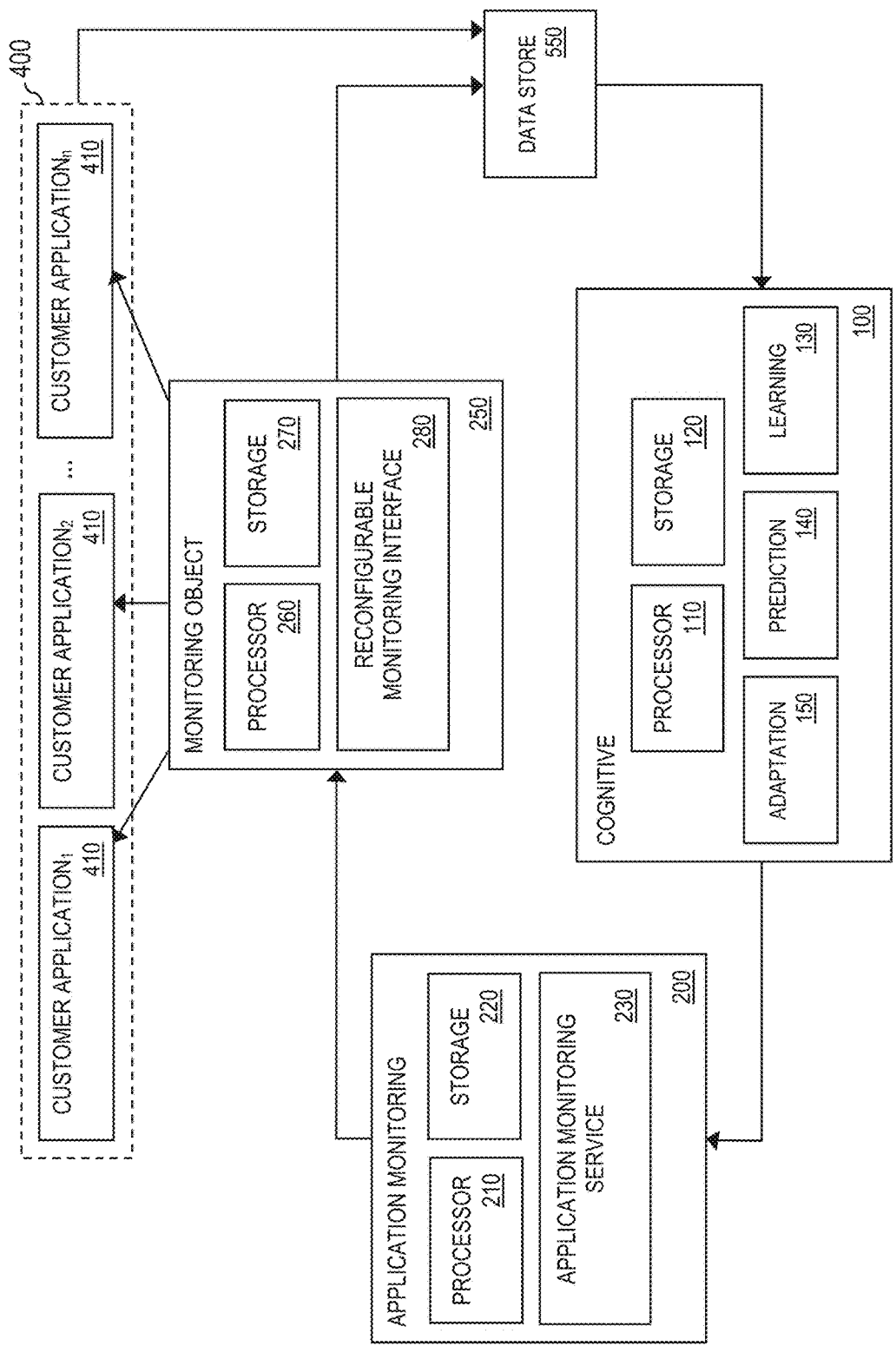
FIG. 3 illustrates an example quality of service (QoS) monitoring framework, in one or more embodiments.

FIG. 3 illustrates an example QoS monitoring framework 101, in one or more embodiments. The monitoring framework 101 supports modifying a monitoring infrastructure for a dynamic service environment 400 (e.g., a dynamic cloud service environment) to reduce operational/monitoring costs and pre-emptively optimize the monitoring infrastructure to suit monitoring needs of customers/clients and/or SLA specifications. The monitoring framework 101 comprises, but is not limited to, at least one of the following: (1) a cognitive system 100 including computation hardware such as, but not limited to, one or more processor devices 110 and one or more storage devices 120, (2) an application monitoring system 200 including computation hardware such as, but not limited to, one or more processor devices 210 and one or more storage devices 220, (3) one or more monitoring objects 250 including computation hardware such as, but not limited to, one or more processor devices 260 and one or more storage devices 270, and (4) one or more data stores 550.

One or more applications may execute/operate on the one or more processor devices 260 of a monitoring object 250 such as, but not limited to, a reconfigurable monitoring interface 280. As described in detail later herein, the one or more monitoring objects 250 are configured to monitor QoS provided by heterogeneous services deployed across the dynamic service environment 400. In one embodiment, a monitoring object 250 is configured to collect, via its monitoring interface 280, QoS and SLA compliance data from the dynamic service environment 400 and one or more underlying hosting environments on either a periodic basis or a continuous basis. The QoS and SLA compliance data collected may comprise, but is not limited to, monitoring data indicative of status of one or more customer applications 410 (e.g., CUSTOMER APPLICATION$_1$, CUSTOMER APPLICATION$_2$, . . . , CUSTOMER APPLICATION$_n$) bound to one or more microservices in the dynamic service environment 400 and deployed across multiple platforms.

In one embodiment, QoS and SLA compliance data collected by the one or more monitoring objects 250 is maintained on the one or more data stores 550. In one embodiment, each data store 550 may comprise a single persistent storage device or a distribution of persistent storage devices.

One or more applications may execute/operate on the one or more processor devices 210 of the application monitoring system 200 such as, but not limited to, an application monitoring service 230. As described in detail later herein, the application monitoring service 230 is configured to control the one or more monitoring objects 250 based one or more monitoring policies. A monitoring policy defines a frequency at which a monitoring object 250 collects QoS and SLA compliance data. For example, the application monitoring service 230 may configure a monitoring interface 280 of a monitoring object 250 to collect QoS and SLA compliance data on either a periodic basis or a continuous basis. The application monitoring system 200 and the one or more monitoring objects 250 together form a monitoring infrastructure for the dynamic service environment 400.

In one embodiment, the application monitoring service 230 comprises, but is not limited to, at least the following components: (1) a first component 850 (FIG. 8) that allows for customizability of the one or more monitoring objects 250, and (2) a second component 860 (FIG. 8) that allows for reusability of the one or more monitoring objects 250 across different platforms and application infrastructures via a representational state transfer (REST) application programming interface (API).

As described in detail later herein, one or more applications may execute/operate on the one or more processor devices 110 of the cognitive system 100 such as, but not limited to, the following: (1) a learning unit 130 configured to retrieve historical data including QoS and SLA compliance data from the one or more data stores 550, and apply one or more machine learning algorithms to the historical data retrieved to derive one or more models, (2) a prediction unit 140 configured to apply the one or more derived models to determine one or more modifications actions for modifying and optimizing the application monitoring service 230, and (3) an adaptation unit 150 configured to adapt the application monitoring service 230 based on the one or more actions.

In one embodiment, the monitoring framework 101 is a centralized computing architecture. In another embodiment, the monitoring framework 101 is a distributed computing architecture.

Figure 4:
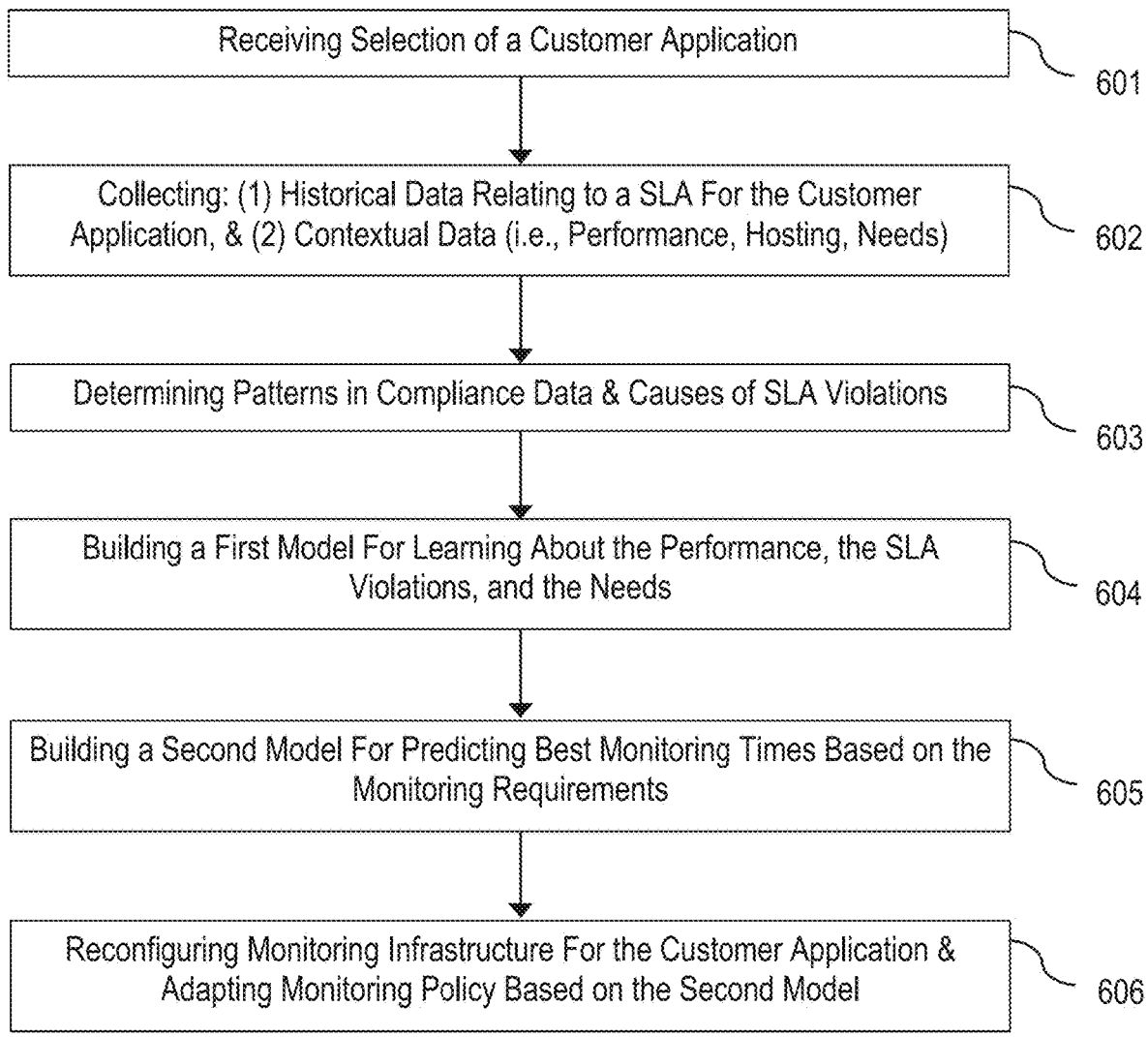
FIG. 4 is a flowchart of an example process for modifying a monitoring infrastructure for a dynamic service environment, in one or more embodiments.

FIG. 4 is a flowchart of an example process 600 for modifying a monitoring infrastructure for a dynamic service environment, in one or more embodiments. In process block 601, receive a selection of a customer application (e.g., customer application 410 in FIG. 3). In process block 602, collect/retrieve historical data relating to a SLA for the customer application and contextual data.

In one embodiment, the historical data comprises, but is not limited to, QoS and SLA compliance data indicative of occurrence of one or more historical SLA violations (i.e., SLA violations that occurred in the past). For example, the QoS and SLA compliance data may include a characterization of one or more microservices bound to the customer application 410 based on compliance history of the services, performance/failure history (i.e., historical SLA violations), or upgrade.

In one embodiment, the contextual data comprises, but is not limited to, information indicative of performance of the customer application, an underlying hosting environment for the customer application, and business/monitoring needs/requirements (e.g., key business metrics) of one or more customers/clients utilizing the customer application. For example, the contextual data may include a characterization of workload for the customer application based on key business metrics as well as distributed policies, deployment contexts, and workload variability for the customer application.

In process block 603, determine patterns in the QoS and SLA compliance data and causes of the one or more historical SLA violations. In process block 604, build/train a first model for learning about the performance of the customer application, the one or more historical SLA violations, and the business/monitoring needs/requirements. In one embodiment, the first model comprises a segmentation model (e.g., resulting from performing customer segmentation) representing represent behavioral characteristics of customers based on key business metrics of the one or more customers/clients as well as the distributed policies and the deployment contexts for the customer application.

In process block 605, build/train a second model for predicting best time periods/monitoring windows for dynamic monitoring of the customer application based on the business/monitoring needs/requirements. In one embodiment, the second model comprises a predictive model (e.g., predictive model 740 in FIG. 5) for determining one or more modifications actions for modifying and optimizing a monitoring infrastructure (e.g., application monitoring system 200 and monitoring object 250 in FIG. 3) for the customer application.

In process block 606, reconfigure the monitoring infrastructure for the customer application and adapt a monitoring policy based on the second model.

In one embodiment, process blocks 601-606 may be performed by at least one of the cognitive system 100 and/or the application monitoring system 200.

Figure 5:
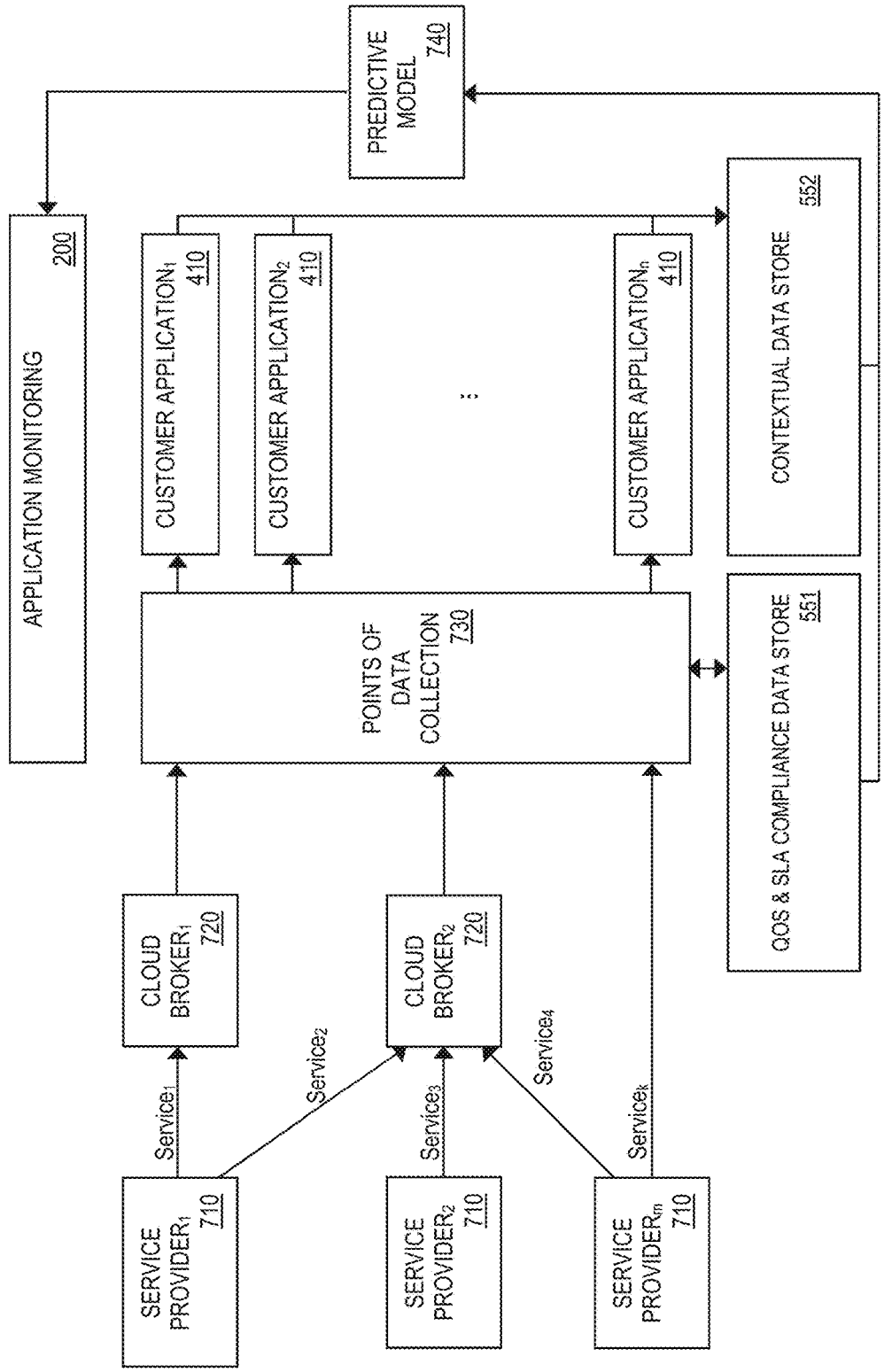
FIG. 5 illustrates an example implementation of the monitoring framework, in one or more embodiments.

FIG. 5 illustrates an example implementation of the monitoring framework 101, in one or more embodiments. Assume the dynamic service environment 400 comprises a dynamic cloud service environment in which the one or more customer applications 410 access one or more microservices (e.g., $Service_1$, $Service_2$, $Service_3$, $Service_k$) provided by one or more service providers 710 (e.g., SERVICE PROVIDER$_1$, SERVICE PROVIDER$_2$, . . . , SERVICE PROVIDER$_m$) via one or more cloud brokers 720 (e.g., CLOUD BROKER$_1$, CLOUD BROKER$_2$). A points of data collection unit 730 comprising the one or more monitoring objects 250 (FIG. 3) collects QoS and compliance data relating to the one or more microservices. The collection unit 730 further collects contextual data from the one or more customer applications 410.

In one embodiment, the QoS and SLA compliance data collected is maintained on one or more data stores 550, such as one or more data stores 551. In one embodiment, the contextual data collected is maintained on one or more other data stores 550, such as one or more data stores 552.

As stated above, based on data retrieved from the data stores 551 and 552, the cognitive system 100 applies a predictive model 740 to determine one or more modifications actions for modifying and optimizing the monitoring infrastructure (i.e., the application monitoring system 200 and the one or more monitoring objects 250) for the one or more customer applications 410. Specifically, the cognitive system 100 adapts a monitoring policy implemented by the application monitoring service 230 of the application monitoring system 200 based on the one or more modification actions.

A SLO may be bounded by one or more preconditions that limit an application scope of the SLO. Let $SLO_i$ generally denote an $i^{th}$ SLO bounded by a set of preconditions $\{cond_{i1}, \ldots, cond_{ij}, \ldots, cond_{jn}\}$. For expository purposes, the term "base metrics" as used in this specification generally refers to a set of metrics corresponding to a SLO that are directly measured for evaluating the SLO. The term "composite metrics" as used in this specification generally refers to a set of metrics that may be derived by aggregating base metrics. A base metric may be classified as either a core metric or a contributing metric. A core metric is directly used for evaluating a SLO. A contributing metric is not directly used for evaluating a SLO but is related to and contributes to the evaluation. Let $M_i$ denote a set of base metrics corresponding to $SLO_i$, wherein $M_i = \{m_1, m_2, \ldots, m_L\}$.

Ideally, to evaluate $SLO_i$, a corresponding set of base metrics $M_i$ is continuously monitored or monitored at frequent intervals. Due to operational/monitoring costs or resource constraints, it may not be necessary to monitor the set of base metrics $M_i$ continuously or at frequent intervals as there is no SLA violation during a majority of the monitoring.

Assume one of the microservices the monitoring framework 101 is configured to monitor is a database service ("dbs") in the cloud service environment. Assume an example SLO associated with the dbs requires an average read/write response time less than or equal to 1 ms if the following preconditions are satisfied: (1) client request rate is less than or equal to x/min, and (2) a total number of active user accounts is less than or equal to Y. TABLE 1 below provides an example set of base metrics corresponding to the example SLO.

TABLE 1

| Base Metric | Base Metric Type | Description |
| --- | --- | --- |
| dbs.active_tasks | Contributing | Number of tasks a thread pool is actively executing |
| dbs.capacity | Contributing | Capacity of caches (e.g., key cache and row cache) |
| dbs.requests.count | Core | Number of client requests |
| dbs.pending tasks | Contributing | Number of pending tasks for the thread pool |
| dbs.load.percentage | Contributing | Disk space percentage used on a node |
| dbs.size | Contributing | Size of cache |
| dbs.total_latency.count | Core | Total latency for all client requests |
| dbs.total_user.count | Core | Total number of active user accounts |
| dbs.db.max_row_size | Contributing | Size of largest compacted row |
| dbs.internal.total_blocked_tasks | Contributing | Cumulative total of currently blocked tasks for the thread pool |

Figure 6:
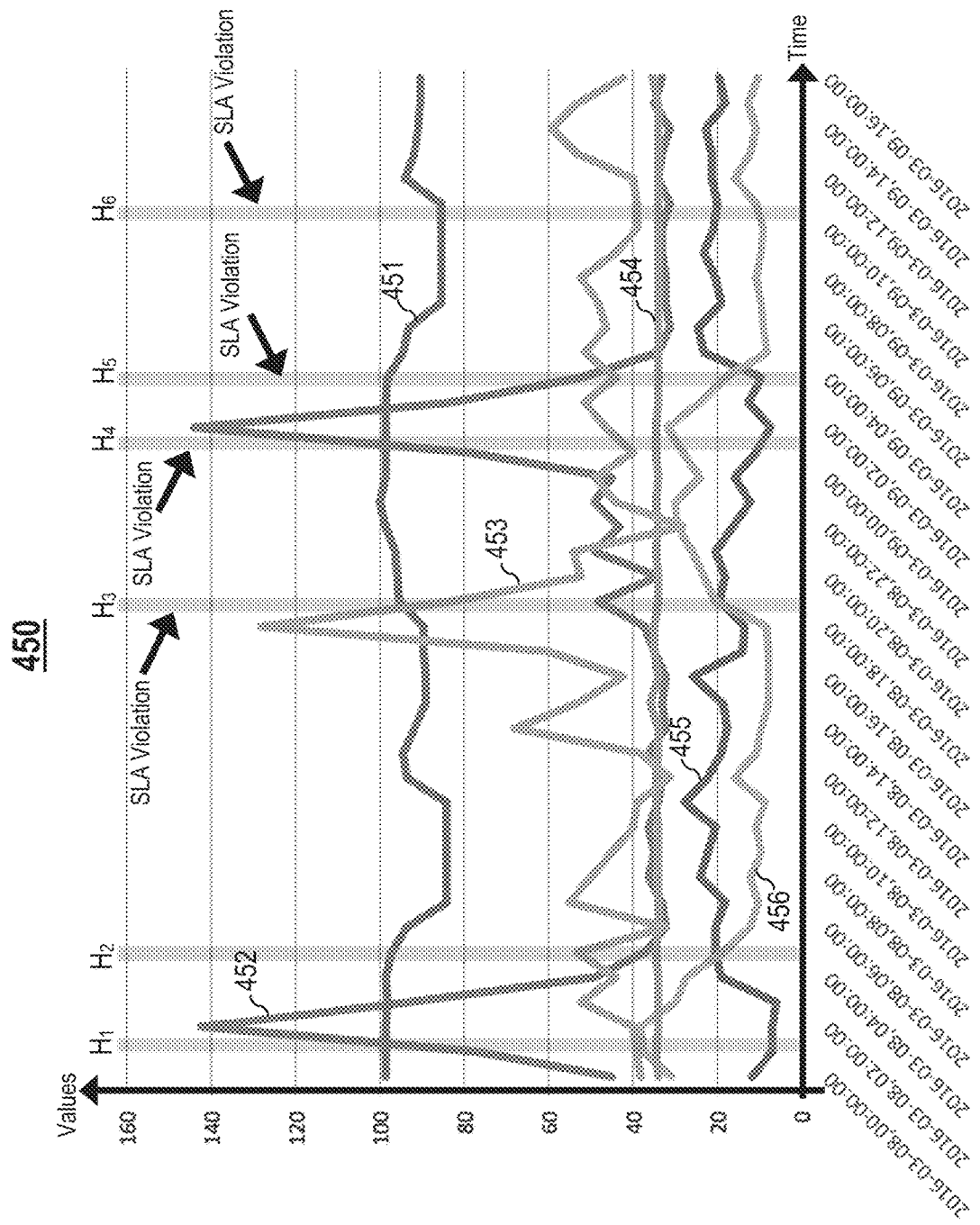
FIG. 6 is an example graph illustrating historical data relating to a database service (dbs) in a dynamic cloud service environment, in one or more embodiments.

FIG. 6 is an example graph 450 illustrating historical data relating to the dbs, in one or more embodiments. The graph 450 comprises multiple curves relating to one or more base metrics, such as a first curve 451 for dbs.capacity, a second curve 452 for dbs.total_user.count, a third curve 453 for dbs.requests.count, a fourth curve 454 for dbs.load.percentage, a fifth curve 455 for dbs.size, and a sixth curve 456 for dbs.total_latency.count.

In a training stage, the collection unit 730 is configured to sample/collect values for the set of base metrics at different historical time points (e.g., historical time points $H_1$, $H_2$, $H_3$, $H_4$, $H_5$, and $H_6$). A feature vector for a historical time point is defined as {dbs.active_tasks, dbs.size, dbs.capacity, dbs.latency.count, . . . , dbs.load.percentage, class_label}, wherein class_label indicates whether a SLA violation occurred at the time point.

Training data may comprise positive samples and negative samples. A positive sample comprises a feature vector corresponding to a historical time point at which a SLA violation occurred (e.g., historical SLA violations occurred at historical time points $H_3$, $H_4$, $H_5$, and $H_6$). A negative sample comprises a feature vector corresponding to a historical time point at which a SLA violation did not occur (e.g., historical time points $H_1$ and $H_2$). As the size of positive samples may be small, negative samples may be sampled to balance amount of negative samples included in the training data.

The cognitive system 100 applies one or more machine learning algorithms to the training data to derive one or more models, such as a segmentation model and a predictive model 740 for estimating/predicting probability of an SLA violation occurring (i.e., for detecting symptoms of a SLA violation before occurrence of the SLA violation). In one embodiment, logistic regression is an example machine learning algorithm applied.

Figure 7:
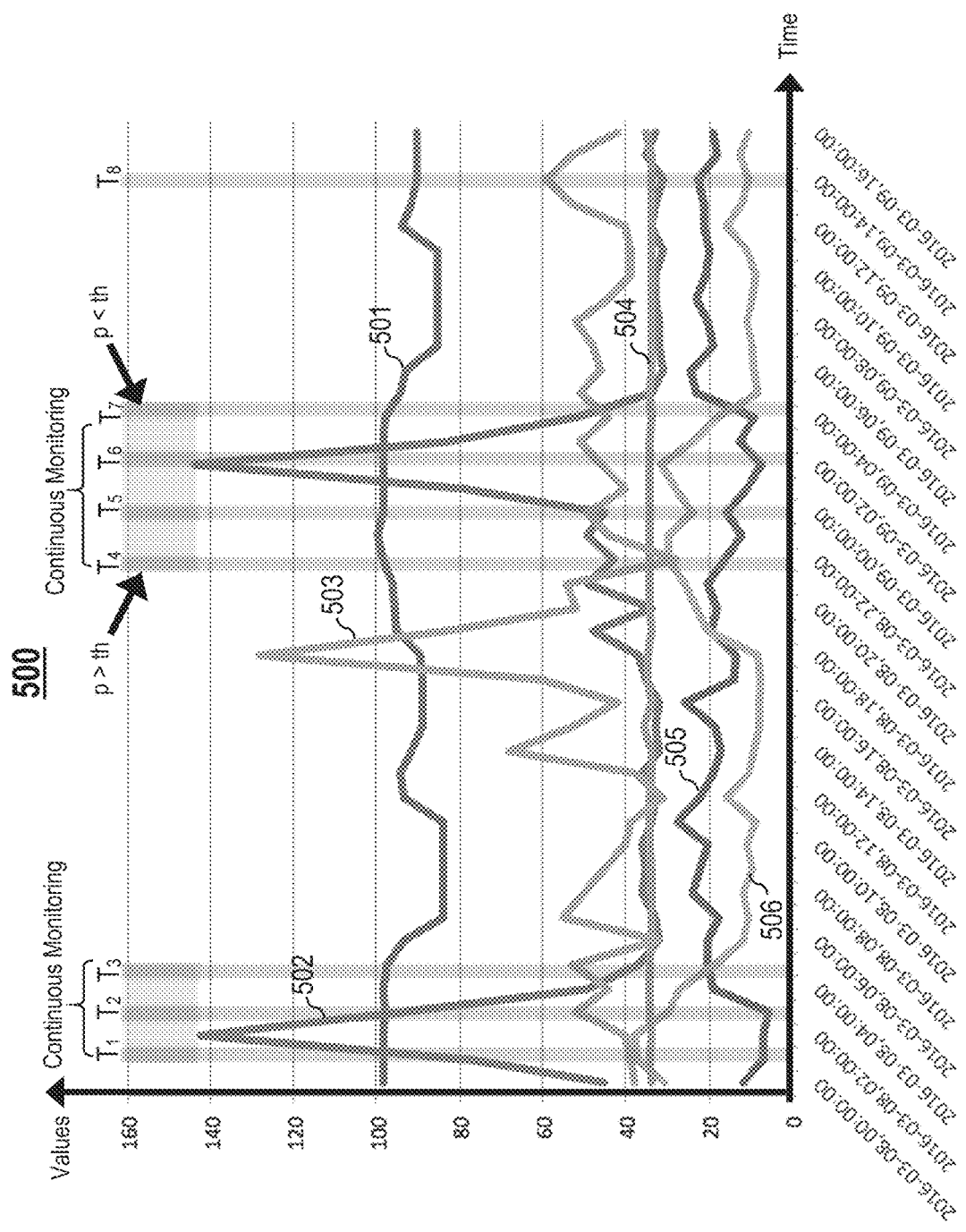
FIG. 7 is an example graph illustrating monitoring data relating to the dbs, in one or more embodiments.

FIG. 7 is an example graph 500 illustrating monitoring data relating to the dbs, in one or more embodiments. The graph 500 comprises multiple curves relating to one or more base metrics, such as a first curve 501 for dbs.capacity, a second curve 502 for dbs.total_user.count, a third curve 503 for dbs.requests.count, a fourth curve 504 for dbs.load.percentage, a fifth curve 505 for dbs.size, and a sixth curve 506 for dbs.total_latency.count.

In one embodiment, in a deployment stage, the monitoring infrastructure for the dynamic service environment 400 may implement at least two different monitoring policies—a dynamic monitoring policy and a continuous monitoring policy (e.g., between time points $T_1$ and $T_3$, $T_4$ and $T_7$). In the dynamic monitoring policy, the monitoring infrastructure provides a dynamic monitoring service during which feature vectors are collected/sampled on a periodic basis (i.e., not continuously). Specifically, the collection unit 703 is configured to sample/collect feature vectors for different time points at a pre-determined frequency/interval (i.e., pre-determined time period/monitoring window) to dynamically monitor a set of base metrics corresponding to a SLO. Let x generally denote a frequency parameter defining a pre-determined frequency/interval at which feature vectors for different time points are collected during the deployment stage. The frequency parameter x may be user-provided/specified. For example, a user may specify that feature vectors should be sampled/collected every x minutes (e.g., x=5, 10, 15, etc.). The smaller the frequency parameter x (i.e., feature vectors are collected more frequently), the higher the operational/monitoring costs but the lower the probability of missing detection of a potential SLA violation.

In the continuous monitoring policy, the monitoring infrastructure provides a continuous monitoring service during which feature vectors are sampled/collected on a continuous basis. Specifically, the collection unit 703 is configured to sample/collect feature vectors for different time points continuously to continuously monitor a set of base metrics corresponding to a SLO.

Let p generally denote a probability that an SLA violation occurred during a particular time point. In the dynamic monitoring policy, for each feature vector sampled/collected for a particular time point, the monitoring framework 101 applies a predictive model 740 (e.g., a predictive model 740 resulting from the training stage) to the feature vector to estimate/predict a probability p that an SLA violation occurred during the particular time point. Let th generally denote a threshold parameter defining a pre-determined threshold for controlling which monitoring policy the monitoring infrastructure should apply. If the estimated/predicted probability p exceeds the threshold parameter th, the cognitive system 100 triggers the monitoring infrastructure to switch to the continuous monitoring policy to invoke the continuous monitoring service; otherwise, the dynamic monitoring service is maintained.

In the continuous monitoring policy, for each subsequent time point occurring after the continuous monitoring service is triggered, if a probability p for the subsequent time point is less than the threshold parameter th, the cognitive system 100 triggers the monitoring infrastructure the stop the continuous monitoring service and switch to the dynamic monitoring policy to invoke the dynamic monitoring service; otherwise, the continuous monitoring service is maintained.

Figure 8:
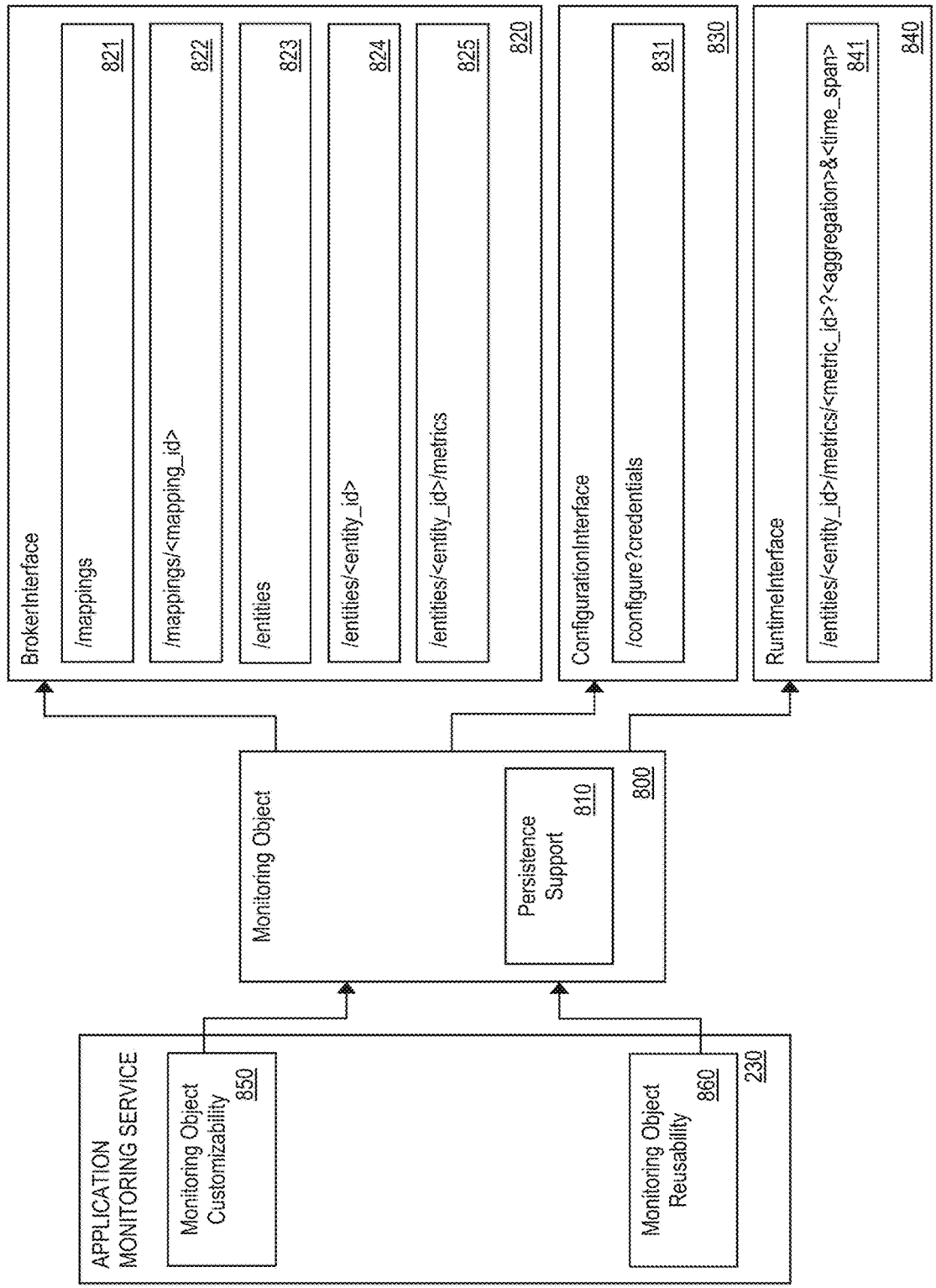
FIG. 8 is an example reconfigurable monitoring object, in one or more embodiments.

FIG. 8 illustrates an example reconfigurable monitoring object 800, in one or more embodiments. The reconfigurable monitoring object 800 is an example implementation of a monitoring object 250 (FIG. 3) that supports dynamic and adaptive modification of a monitoring infrastructure for a dynamic service environment (e.g., a dynamic cloud service environment). The reconfigurable monitoring object 800 provides a standard service interface 810 (generally referenced as "Persistence Support" in this specification) for monitoring and notification as a generic REST API that abstracts from heterogeneity of different service interfaces.

In one embodiment, the reconfigurable monitoring object 800 comprises a service on a PaaS platform (e.g., IBM's Bluemix, etc.). The reconfigurable monitoring object 800 is customizable (e.g., via the first component 850 of the application monitoring service 230) based on a particular role the monitoring object 800 assumes in an overall system, and is reusable (e.g., via the second component 860 of the application monitoring service 230) across different platforms.

In one embodiment, the reconfigurable monitoring object 800 provides at least three different types of service interfaces: a first service interface 820 generally referenced as "Brokerinterface" in this specification, a second service interface 830 generally referenced as "ConfigurationInterface" in this specification, and a third service interface 840 generally referenced as "RuntimeInterface" in this specification.

In one embodiment, the Brokerinterface 820 is configured to provide at least two different types of data: (1) lists 823-825 of entities and metrics currently monitored by the reconfigurable monitoring object 800, and (2) mappings 821-822 of existing bindings to the reconfigurable monitoring object 800 that may be used by an external broker to determine current load. The BrokerInterface 820 may be used to optimize bindings between requests and the reconfigurable monitoring object 800 to select a best fit for different business/monitoring needs/requirements of customers/clients.

In one embodiment, the ConfigurationInterface 830 is configured to provide at least the following functionalities: (1) configuring tenancy of the reconfigurable monitoring object 800 to facilitate multi-tenancy and customization of the reconfigurable monitoring object 800, and (2) one or more other functionalities to further support customization of the reconfigurable monitoring object 800, such as, but not limited to, a functionality 831 for configuring access credentials for Cloud computing resources.

In one embodiment, the RuntimeInterface 840 is configured to control execution of one or more main operations of the reconfigurable monitoring object 800. The RuntimeInterface 840 provides a standardized means 841 for collecting one or more base metrics corresponding to a SLO from different entities and specifying different aggregation functions and time spans for monitoring activities.

Figure 9:
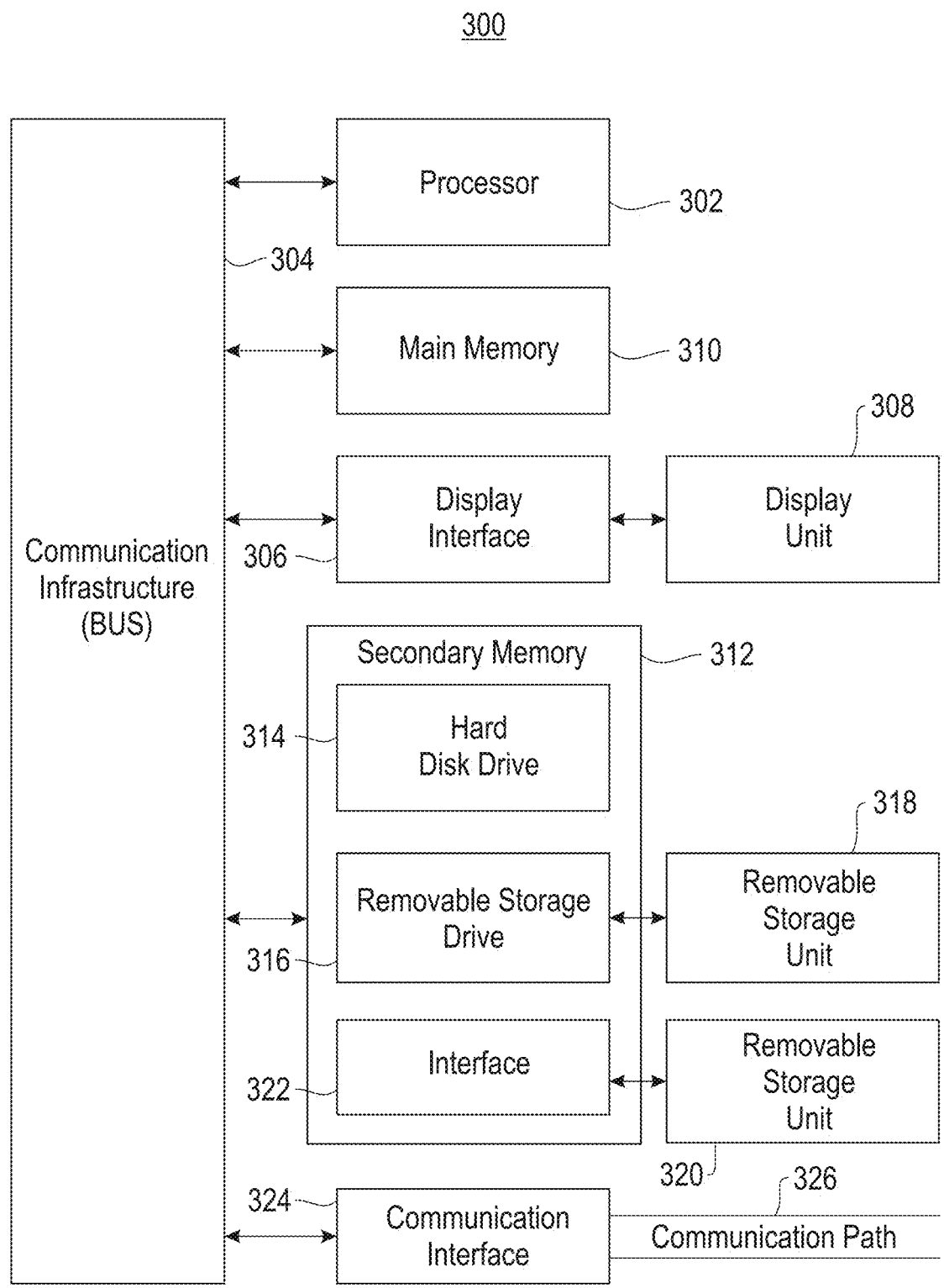
FIG. 9 is a high level block diagram showing an information processing system useful for implementing an embodiment of the present invention.

FIG. 9 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A quality of service (QoS) monitoring framework comprising:
    at least one processor; and
    a non-transitory processor-readable memory device storing instructions that when executed by the at least one processor causes the at least one processor to perform operations including:
        dynamically binding one or more customer applications to one or more microservices in a dynamic service environment;
        collecting compliance data and contextual data from the dynamic service environment and one or more hosting environments;
        training a predictive model by applying machine learning to a portion of the compliance data that is indicative of occurrence of one or more historical service level agreement (SLA) violations;
        predicting probability of a SLA violation occurring by applying the predictive model to the compliance data and the contextual data; and
        dynamically switching a frequency at which a monitoring infrastructure for the one or more customer applications collects monitoring data for the one or more customer applications between a continuous basis or a periodic basis based on the predicted probability, wherein the dynamically switching comprises:
            if the monitoring data is collected continuously and the predicted probability is less than a pre-determined threshold, dynamically switching the frequency from the continuous basis to the periodic basis; and
            if the monitoring data is collected at pre-determined intervals and the predicted probability exceeds the pre-determined threshold, dynamically switching the frequency from the periodic basis to the continuous basis.

2. The QoS monitoring framework of claim 1, wherein:
    the compliance data comprises QoS and SLA compliance data indicative of the occurrence of the one or more historical SLA violations; and
    the contextual data comprises information indicative of performance of the one or more customer applications, the one or more hosting environments, and one or more requirements of one or more customers utilizing the one or more customer applications.

3. The QoS monitoring framework of claim 2, further comprising:
    predictively analyzing and modeling the one or more requirements based on the contextual data and the compliance data.

4. The QoS monitoring framework of claim 3, further comprising:
    generating one or more segmentation models representing one or more behavioral characteristics of the one or more customers based on the compliance data and the contextual data.

5. The QoS monitoring framework of claim 4, further comprising:
    generating one or more predictive models based on the one or more segmentation models, the compliance data, and the contextual data.

6. The QoS monitoring framework of claim 5, further comprising:
    determining one or more modifications actions for modifying and optimizing the monitoring infrastructure based on the one or more predictive models to reduce costs associated with monitoring the one or more customer applications.

7. The QoS monitoring framework of claim 6, wherein the one or more modification actions comprises adapting a monitoring policy controlling the frequency at which the monitoring infrastructure collects the monitoring data.

8. The QoS monitoring framework of claim 7, wherein the monitoring policy is adapted to a continuous monitoring policy specifying collection of the monitoring data on the continuous basis.

9. The QoS monitoring framework of claim 7, wherein the monitoring policy is adapted to a dynamic monitoring policy specifying collection of the monitoring data on the periodic basis.

10. The QoS monitoring framework of claim 1, wherein the dynamic service environment comprises a dynamic cloud service environment.

11. A method comprising:
    dynamically binding one or more customer applications to one or more microservices in a dynamic service environment;
    collecting compliance data and contextual data from the dynamic service environment and one or more hosting environments;
    training a predictive model by applying machine learning to a portion of the compliance data that is indicative of one or more historical service level agreement (ISLA) violations;
    predicting probability of a SLA violation occurring by applying the predictive model to the compliance data and the contextual data; and
    dynamically switching a frequency at which a monitoring infrastructure for the one or more customer applications collects monitoring data for the one or more customer applications between a continuous basis or a periodic basis based on the predicted probability, wherein the dynamically switching comprises:
        if the monitoring data is collected continuously and the predicted probability is less than a pre-determined threshold, dynamically switching the frequency from the continuous basis to the periodic basis; and
        if the monitoring data is collected at pre-determined intervals and the predicted probability exceeds the pre-determined threshold, dynamically switching the frequency from the periodic basis to the continuous basis.

12. The method of claim 11, wherein:
the compliance data comprises QoS and SLA compliance data indicative of the occurrence of the one or more historical SLA violations; and
the contextual data comprises information indicative of performance of the one or more customer applications, the one or more hosting environments, and one or more requirements of one or more customers utilizing the one or more customer applications.

13. The method of claim 12, further comprising:
predictively analyzing and modeling the one or more requirements based on the contextual data and the compliance data.

14. The method of claim 13, further comprising:
generating one or more segmentation models representing one or more behavioral characteristics of the one or more customers based on the compliance data and the contextual data.

15. The method of claim 14, further comprising:
generating one or more predictive models based on the one or more segmentation models, the compliance data, and the contextual data.

16. The method of claim 15, further comprising:
determining one or more modifications actions for modifying and optimizing the monitoring infrastructure based on the one or more predictive models to reduce costs associated with monitoring the one or more customer applications.

17. The method of claim 16, wherein the one or more modification actions comprises adapting a monitoring policy controlling the frequency at which the monitoring infrastructure collects the monitoring data.

18. The method of claim 17, wherein the monitoring policy is adapted to a continuous monitoring policy specifying collection of the monitoring data on the continuous basis.

19. The method of claim 17, wherein the monitoring policy is adapted to a dynamic monitoring policy specifying collection of the monitoring data on the periodic basis.

20. A computer program product comprising a computer-readable hardware storage medium having program code embodied therewith, the program code being executable by a computer to implement a method comprising:
dynamically binding one or more customer applications to one or more microservices in a dynamic service environment;
training a predictive model by applying machine learning to a portion of the compliance data that is indicative of one or more historical service level agreement (SLA) violations;
predicting probability of a SLA violation occurring by applying the predictive model to the compliance data and the contextual data; and
dynamically switching a frequency at which a monitoring infrastructure for the one or more customer applications collects monitoring data for the one or more customer applications between a continuous basis or a periodic, basis based on the predicted probability, wherein the dynamically switching comprises:
if the monitoring data is collected continuously and the predicted probability is less than a pre-determined threshold, dynamically switching the frequency from the continuous basis to the periodic basis; and
if the monitoring data is collected at pre-determined intervals and the predicted probability exceeds the pre-determined threshold, dynamically switching the frequency from the periodic basis to the continuous basis.

* * * * *